Dec. 18, 1934.   S. E. ALLEN ET AL   1,984,510
RELEASE VALVE
Filed Nov. 6, 1930   2 Sheets-Sheet 1
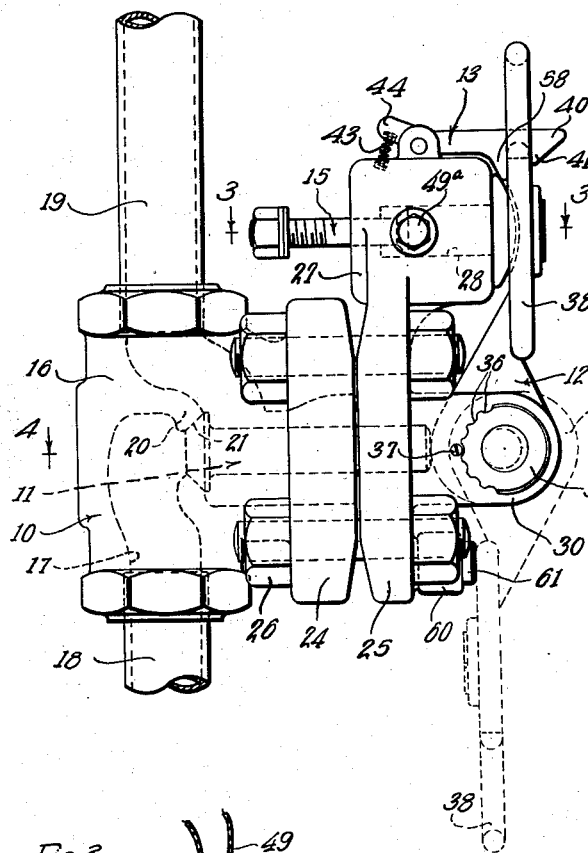
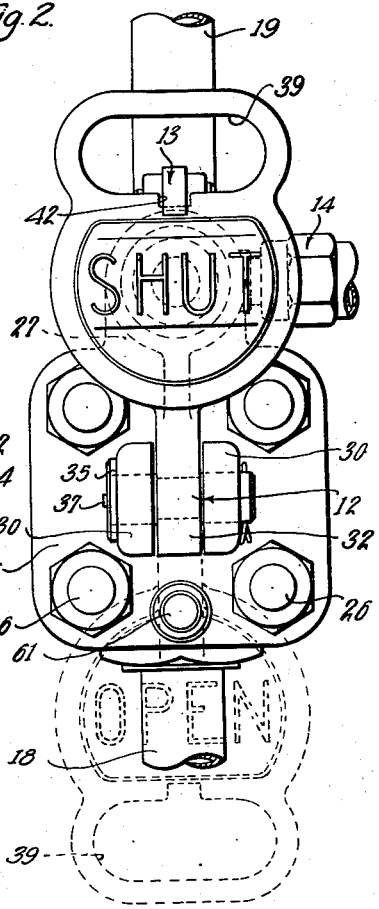
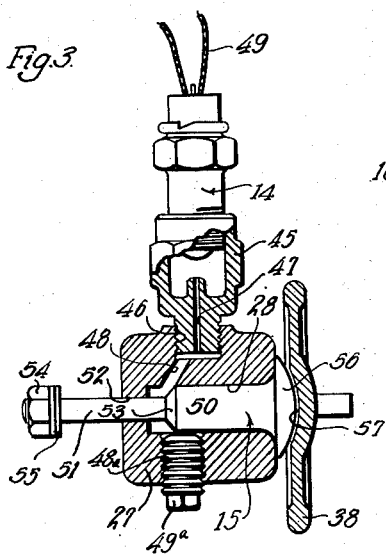
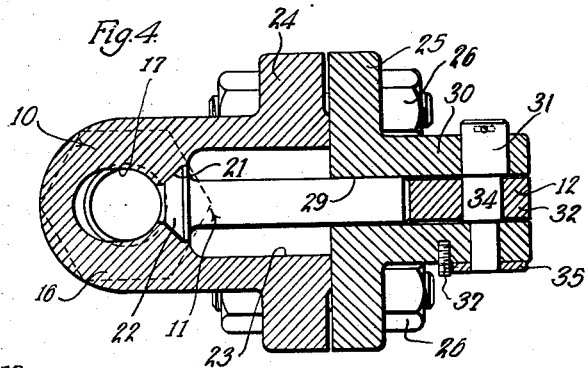
INVENTORS
Scott E. Allen
AND
Ozro N. Wiswell
THEIR ATTORNEY

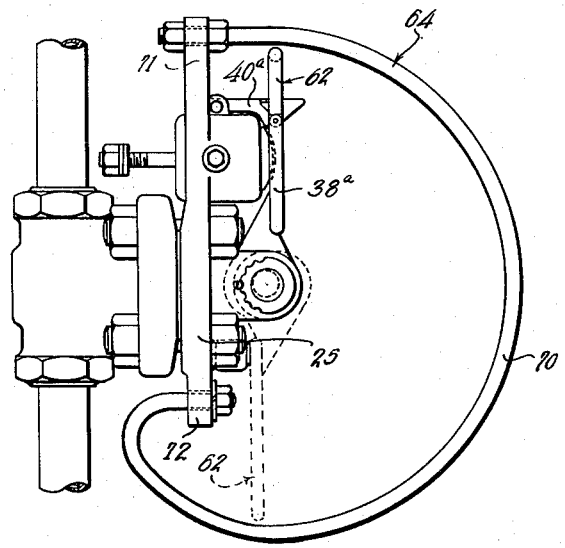
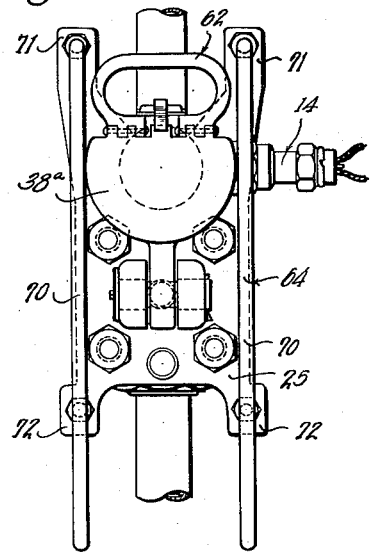
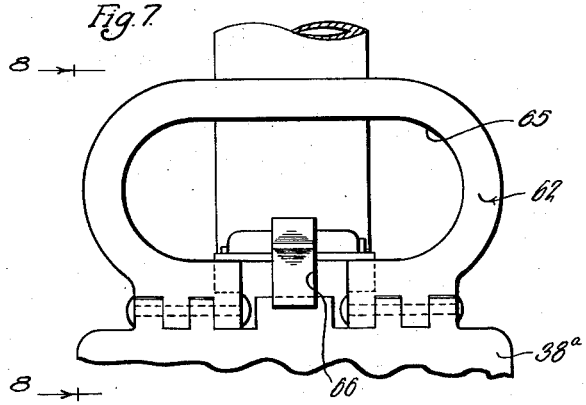
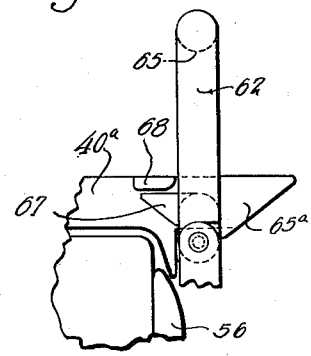

Patented Dec. 18, 1934

1,984,510

UNITED STATES PATENT OFFICE 1,984,510

RELEASE VALVE

Scott E. Allen and Ozro N. Wiswell, Los Angeles, Calif., assignors, by mesne assignments, to C-O-Two Fire Equipment Company, Newark, N. J., a corporation of Delaware Application November 6, 1930, Serial No. 493,761

10 Claims. (Cl. 137—139)

This invention relates to a release valve, and relates more particularly to a release valve that may be operated or released by manual means, or electrically.

The present invention provides a valve for holding fluid under pressure that may be manually opened or released, or that may be released from a remote point by closing an electrical contact either manually or by automatic means, such as a thermostatic means. The valve is adapted for use in various situations, and is particularly well suited for use in a fire extinguishing system where carbon dioxide gas, or the like, is normally held under pressure and is liberated to extinguish a fire upon the release or operation of the valve. Throughout the following detailed description, the invention will be set forth as embodied in forms adapted for use in a fire extinguishing system where it normally holds a gas against discharge from a conduit, and which are operable manually or automatically by electrical means to liberate the gas. It is to be understood that the invention is not to be considered as restricted to the particular embodiments about to be described, or to the uses or applications of the valve referred to herein.

It is an object of the invention to provide a release valve that normally holds a fluid under pressure, and that may be manually operated to liberate the gas, or that may be operated from a remote point to release or liberate the gas.

It is another object of the invention to provide a control for a release valve that may be operated by an electrically controlled actuating device of the general character fully described and claimed in our co-pending application for Letters Patent entitled "Electrically controlled actuating device" filed April 30, 1930, Serial Number 448,673, now Patent No. 1,933,694, granted November 7, 1933.

It is another object of the invention to provide a valve of the character mentioned particularly suited for use in a fire extinguishing system, that may be directly operated manually, or that may be operated to liberate the fire extinguishing gas by the manual operation of a switch or by an automatic means, such as thermostat.

It is another object of the invention to provide a release valve of the character referred to that embodies a holding means normally holding the valve proper closed, that is retained in its holding position by a latch releasable manually or by an electrically controlled actuating device, or the like.

It is another object of the invention to provide a latch means for use in connection with a valve of the character mentioned, that may be readily released manually, or that may be released by fluid pressure means.

It is another object of the invention to provide a release valve of the character mentioned, that is dependable and positive in operation.

It is a further object of the invention to provide a release valve of the character mentioned in which the parts that are moved or operated when the valve is released are protected by a guard means, which prevents an object from being placed in a position where it will interfere or hinder the operation of the valve.

It is a further object of the invention to provide a release valve of the character mentioned that is adapted to normally hold a fluid under comparatively high pressures, and that is of simple and sturdy construction.

Other objects and features of our invention will be best and more fully understood from the following detailed description of typical forms and applications of the invention, throughout which description reference will be had to the accompanying drawings, in which:

Fig. 1 is a side elevation of the valve illustrated in the closed position, and showing the operated or open position of certain of the parts in broken lines. Figure 2 is a front elevation of the valve when in the closed position, illustrating the operated position of the operating arm in broken or dotted lines. Fig. 3 is a transverse detailed sectional view of a portion of the device, being a view taken as indicated by line 3—3 on Fig. 1. Fig. 4 is a transverse detailed sectional view taken as indicated by line 4—4 on Fig. 1. Fig. 5 is a side elevation of a form of our invention embodying a guard means and an improved latch. Fig. 6 is a front view of the valve illustrated in Fig. 5. Fig. 7 is an enlarged front elevation of the handle and a portion of the latch embodied in this form of the invention. Fig. 8 is a side elevation of a portion of the latch means, being a view taken as indicated by line 8—8 on Fig. 7.

The form of the invention illustrated in Figs. 1 to 4, inclusive, of the drawings includes, generally, a valve proper 10, having an operating or control stem 11, and a control for the valve 10 which includes a cam means 12 for normally holding the stem 11 in a position where the valve is closed, latch means 13 for normally releasably holding the cam means 12 in the closed or holding position, an electrically controlled actuating device 14, and means 15 operable by the device 14 to release the latch means 13 and to operate the cam means 12 to permit opening of the valve 10.

In accordance with the broader aspects of the invention, any suitable type of valve may be incorporated in the construction. In the drawings, we have shown a more or less common form of valve 10, including a body 16 having a fluid passage 17. A fluid conduit 18 is shown threaded into one end of the passage 17. The conduit 18 may be considered a supply conduit for carrying fluid or a gas under pressure. A discharge pipe or conduit 19 may be connected with the discharge end of the passage 17. A web 20, intersecting the passage 17, is provided within the body 16 of the valve. A suitable valve seat 21 is provided around the portion of the passage 17 extending through the web. A valve head 22 normally co-operates with the seat 21 to prevent the flow of fluid through the valve. The valve head 22 is arranged so that the fluid under pressure from the conduit 18 tends to open it or unseat it. The operating stem 11 of the valve projects outwardly or beyond the head 22. The stem 11 extends through an opening 23 in the body 16 of the valve and projects from, what may be termed, the forward side of the valve. Flanges 24 are provided on the body 16 around the opening 23.

The control for the valve 10 includes a body 25 for carrying the cam means 12, the latch means 13, and the means 15. The body 25 may be in the nature of a flat, plate-like member and may be directly secured to the body 16 through the flanges 24 of the valve body. The body 25 may be secured to the flanges 24 by suitable bolts 26. An extension in the form of a cylinder 27 is provided at one end, preferably the upper end, of the body 25. The cylinder 27 may be integral with the body 25 and may project forwardly from the body, as illustrated throughout the drawings. The opening or chamber 28 of the cylinder may be round in cross section, and is preferably horizontally disposed. The outer or projecting end of the valve stem 11 extends through an opening 29 in the body 25, to project from the forward side of the body 25. The opening 29 acts to slidably guide the valve stem 11.

The cam means 12 for normally holding the valve closed operates to engage the valve stem 11 to hold the head 22 in effective sealing engagement with the valve seat 21. The means 12 includes lugs 30 projecting from the forward side of the body 25, at opposite sides of the opening 29. A pin 31 extends between the lugs 30 and pivotally carries a cam 32. The cam 32 is positioned and shaped so that it is in pressural engagement with the outer end of the stem 11 when it is in the holding or closed position. In practice, the cam 32 may be shaped and mounted so as to exert a considerably inward pressure on the valve stem 11, when it is in the closed position, to maintain the head 22 in tight engagement with the valve seat 21 and to withstand high fluid pressures in the receiving end of the passage 17. In accordance with the invention, the cam 32 is shaped so that the valve stem 11 is free to move outwardly when the cam is rotated in one direction from the position illustrated in the drawings. In the case illustrated, the valve stem 11 is permitted to move outwardly upon rotation or pivoting of the cam 32 in a clockwise direction.

In the preferred form of the invention, means is provided for adjusting or varying the action of the cam 32. The central portion 34 of the pin 31, which carries the cam 32, is eccentric to the portions of the pin carried between lugs 30. A circular head 35 is provided on one end of the pin 31. A plurality of spaced notches 36 are provided in the periphery of the head 35, and a removable pin or set screw 37 is provided to extend into or co-operate with any one of the notches 36 to set or retain the pin 31 in different rotative positions. The set screw 37 may be screwthreaded into an opening in a lug 30 and may be readily removed when it is desired to adjust the cam.

The latch means 13 for releasably holding the cam 32 in a position where it is in pressural engagement with the valve stem 11 includes a flap or arm 38 projecting from the cam 32. The arm 38 projects upwardly from the cam 32 when the control is in the latched or holding position, and may be formed integral with the cam. In the particular case illustrated, the arm 38 is a flat part and is substantially parallel with the body 25 when in the up or latched position. A handle or hand-receiving opening 39 is provided in the upper portion of the arm. The arm projects upwardly to a point above the top of the cylinder 27, and the lower edge of the opening 39 is at a point a short distance above the top of the cylinder 27.

In accordance with the invention, the cam 32 is shaped and mounted so that the arm 38 will remain in the up position, where the valve is closed, until deliberately operated to the down or open position. However, it has been found practical to provide a latch 40 for positively releasably holding the arm in the up or closed position. The latch 40 is pivotally mounted on the top or upper side of the cylinder 27 and projects forwardly from the cylinder to co-operate with the arm 38. A catch or nose 41 projects downwardly from the latch 40 and is adapted to co-operate with a notch 42 in the lower edge of the opening 39 to releasably hold the arm 38 in the up position where the cam 32 is in pressural engagement with the valve stem 11. A spring 43 may be arranged under compression between the cylinder 27 and a rearwardly extending arm 44 on the latch to yieldingly retain the latch in holding engagement with the arm 38. The latch 40 may be released manually to permit lowering of the arm 38 to release the valve stem 11 by depressing the arm 44 or by raising the forward portion of the latch to release the nose 41 from the notch 42. It will be apparent how lowering of the arm 38, from the position illustrated in Figs. 1 and 2 of the drawings in full lines to the position illustrated in the dotted or broken lines, rotates the cam 32 to a position where the fluid under pressure in the passage 17 is free to force the valve head 22 outwardly so that it may discharge through the conduit 19.

The electrically controlled actuating device 14 is provided to operate the means 15 to release the latch 40 and to operate the arm 38 downwardly upon the energization of an electrical circuit. The device 14 is operable to generate a gas, or fluid pressure, for operating the means 15 and, in accordance with the broader principles of the invention, any suitable means or device for providing a fluid pressure may be employed for operating the means 15. In the drawings, we have illustrated an actuating device 14 of the character described in our co-pending application referred to above. The actuating device 14 is operable to effect or provide a pressure within the chamber 28 to actuate the means 15. A modifier or adapter 45 may be screw-threaded into an opening 46 in the cylinder 27 to carry the actuating device 14. The adapter 45 is tubular, and a reduced passage 47 extends from the interior of the adapter to its end, where it discharges into a port 48 communicating with the rear end of the chamber 28.

The actuating device 14 is screw-threaded into the outer end of the adapter 45, and electrical conductors 49 extend into the outer end of the device. The device 14 contains an inflammable material, such as a suitable powder, that is ignited upon electrical current being passed through the conductors 49. The inflammable material contained in the actuating device 14 explodes or burns very rapidly, to provide a high gas pressure within the adapter 45. The gas under pressure, passed into the adapter 45 from the device 14, is discharged into the chamber 28 through the passage 47 and the port 48. In some cases, the actuating device may be applied directly to the cylinder opening.

A port or opening 48$^a$ may communicate with the inner end of the chamber for receiving a conduit for passing fluid pressure into the chamber. The opening 48$^a$ may be threaded. A removable plug 49$^a$ is shown closing the opening 48$^a$. The opening 48$^a$ is intended to receive a fluid pressure conduit for supplying fluid pressure from a remote source for operating the means 15, in the event that an operating medium or means of this character is to be employed. The means 15 is operable by the fluid pressure generated by the actuating device 14, or by fluid pressure supplied through the port 48$^a$, to automatically release the valve 40 and swing the arm 38 downwardly so that the valve head 22 may be displaced or unseated by the fluid under pressure passed into the valve. The means 15 includes a plunger 50 slidable in the cylinder chamber 28. The plunger 50 may be provided with a reduced stem 51 extending through an opening 52 in the rear end of the cylinder. The reduced portion 51 provides a shoulder 53 on the plunger 50 which is adapted to be acted upon by the gas under pressure discharged into the chamber. A stop nut 54 may be provided on the outer end of the stem 51 to limit the forward movement of the plunger 50. Bumper washers 55, of leather or the like, may be provided on the stem 51 at the nut 54.

A head 56 is provided on the forward end of the plunger 50, beyond the end of the cylinder. The head 56 may be disc-shaped, and may be rounded or convexed as illustrated through the drawings. The head 56 is provided to engage the arm 38, and a recess or depression 57 may be provided in the arm to receive the head. The present invention provides means whereby forward movement of the plunger 50 causes the latch 40 to be raised and released from the arm. A cam lug 58 projects downwardly from the latch 40 and engages the head 56 when the parts are in the normal or closed position. The lug 58 is provided with an upwardly and rearwardly inclined face. Pressure applied to the plunger 50 to move it forward causes the engagement between the lug 58 and the head 56 to raise the latch 40 out of engagement with the arm 38. It will be apparent how discharge or actuation of the device 14, to provide gas under pressure in the chamber 28, causes the plunger 50 to be operated forwardly with considerable force to automatically release the latch 40 and swing the arm 38 downwardly.

A stop or bumper is mounted on the body 25 to stop the downward swinging of the arm 38. The stop may include a socket member 60 and a body 61 of lead, or the like, carried by the socket and projecting forwardly therefrom. The stop body 61 is "dead" or formed of a "dead material" having very little resiliency, so that it will not cause rebound of the arm. The stop 60 is positioned so that the arm 38 engages the stop body 61 when it is swung downwardly. The lead body 61 acts to deaden or absorb the downward force of the arm 38 and prevents rebound and fracturing, or breaking, of the arm.

The arm 38 may be marked to indicate when the valve 10 is shut or open. In the particular case illustrated, the word "shut" is marked on the forward side of the arm 31 when it is in the up position to indicate that the valve is closed. The word "open" may be provided on the inner side of the arm 38, which is foremost when it is in the down position, to indicate that the valve is released or opened. The markings or words "shut" and "open" may be painted and/or cast on the arm.

Under normal conditions when the valve is connected in a line or conduit for passing a fluid under high pressures, the parts are in the positions illustrated in full lines throughout the drawings. When the cam 32 is in tight pressural engagement with the stem 11 to hold the valve head 22 in the closed position, it positively prevents the flow of fluid through the valve 10. When it is desired to manually operate or release the valve, the latch 40 is raised upwardly so that the nose 41 is raised out of the notch 42 and the arm 38 is swung downwardly. Shifting of the arm 38 to a down position, such as is illustrated in broken lines in Figs. 1 and 2 of the drawings, operates the cam 32 to a position where the stem 11 is free to move outwardly and the gas under pressure is liberated or discharged through the conduit 19. The valve may be operated or released from a remote point by passing electrical current through the conductors 49. Upon current passing through the conductors 49, the inflammable material contained within the device 14 is ignited and generates gas pressure within the chamber 28, which forces the plunger 50 forwardly to automatically release the latch 40 and swing the arm 38 downwardly.

In Figs. 5 to 8 inclusive of the drawings, we have illustrated a form of the invention that embodies a handle or manual operating means 62 upon the arm 38$^a$, that is operable to automatically release the latch 40$^a$ when it is pulled downwardly and forwardly to operate the arm 38$^a$. Further in these figures we illustrate a guard means 64 for preventing the arm 38$^a$ from striking a person or object when it is forcibly swung down upon the discharge of the actuating device 14, and to prevent an object from being placed in a position where it would interfere with the movement of the arm 38$^a$.

The handle 62 is pivotally or hingedly mounted on the upper edge of the arm 38$^a$. The handle 62 has a hand receiving opening 65. The latch 40$^a$ may be similar, generally, to the latch 40 described above, and has a lug or nose 65$^a$ for cooperating with a notch 66 in the lower edge of the opening 65. A rearwardly projecting lug 67 is provided on the handle 62. The lug 67 is adapted to engage a dog 68 on the latch 40$^a$ when the handle 62 is pulled downwardly and forwardly. The lug 67 engages the dog 68 to raise the latch and lift the nose 65$^a$ out of engagement with the handle, upon that handle being pulled downwardly to open the valve. The latch 40$^a$ and the arm 38ª may be automatically operated in the same member as the corresponding parts in the form of the invention described above by the forward movement of the head 56 on the plunger 50.

The guard means 64 incorporated in this form of the invention may include two horizontally spaced bars 70. The upper ends of the bars 70 may be attached to lugs 71 projecting upwardly from the upper end of the body 25 of the construction. The bars 70 are curved outwardly and downwardly from the lugs 71 and their lower ends are attached to the body 25. The lower ends of the bars 70 may be connected to spaced ears 72 projecting downwardly from the lower corners of the body 25. In accordance with the invention, the bars 70 are shaped and positioned so that they permit downward movement of the arm 38ª and do not, in any way, interfere with the proper operation of the device. It is to be noted that the bars 70 prevent objects from being placed in front of the valve, where they might interfere with its operation and prevent a person from standing in a position where the arm 38ª might strike him upon being forcibly operated by the means 15.

It is to be noted that the present invention provides a practical and dependable release valve that may be quickly and easily released manually, or that may be automatically released by suitable fluid pressure means. It is to be understood that any suitable fluid pressure means may be substituted for the actuating device 14 to provide the fluid pressure for operating the plunger 50. Upon the discharge of fluid under pressure into the chamber 28, the latch 40 is released and the arm 38 is forcibly swung downward. It is to be noted that the cam 32 is mounted and positioned so that it normally retains the valve head 22 in tight sealing engagement with the seat 21. The pin 31 mounts the cam 32, so that the fluid or gas under pressure in the passage 17 acts radially on the cam 32 through the stem 11 so that there is no tendency for the gas pressure to rotate the cam. Further, the cam 32 may be adjusted by means of the pin 37 and the eccentric portion 34, so that setting of the arm 38 in the up or normal position forces the valve head 22 tightly against the seat 21. With this construction, the valve is adapted to withstand very high gas pressures without leaking. The operation or releasing of the valve either manually or automatically by the means 15 is positive and dependable, so that the valve is particularly well suited for use in fire extinguishing system, or the like.

Having described only typical preferred forms of our invention, we do not wish to limit ourselves to the specific details set forth, but wish to reserve to ourselves any changes or variations that may appear to those skilled in the art or fall within the scope of the following claims:

Having described our invention, we claim:

1. A device of the character described, including valve means operable to hold fluid under pressure, a cam for holding the valve means in the closed position operable to a position where the valve means is free to open, an operating arm on the cam, a latch releasably engaging the arm for retaining the cam in position where it holds valve means closed, and electrically actuated fluid pressure means for releasing the latch and for operating the said arm to a position where the valve means is free to open, the last mentioned means including a fluid pressure operated plunger for releasing the latch and transmitting force to the arm.

2. A device of the character described, including a valve having a stem, a cam for engaging the stem to hold the valve closed, an operating arm on the cam, a manually releasable latch for engaging the arm to releasably hold the cam in a position where the valve is closed, a plunger operable to release the latch and deliver operating force to the arm to rotate the cam to a position where the valve is free to open, and means for applying pressure to the plunger.

3. A device of the character described, including a valve having a control member and a control for the valve including a cam for engaging the control member to normally retain the control member in position where the valve is closed, a swingable arm on the cam for operating the cam, and a stop of yielding inelastic material for limiting the movement of the arm.

4. A device of the character described, including a valve having an operating stem and a cylinder chamber, and a control for the valve including a cam operable to retain the stem in a position where the valve is closed, an arm on the cam, and explosive means for rotating the cam to a position where the valve is free to open, including a plunger slidable in the chamber and adapted to cooperate with the arm to rotate the cam, and a charge of explosive material adapted to generate pressure for moving the plunger.

5. A device of the character described, including a valve having a control member, and a control for the valve including a cam rotatably mounted for engaging the control member to normally retain the control member in position where the valve is closed, the cam being related to the control member so that the cam is held against movement until deliberately operated, and means for adjusting the axis of the cam including an eccentric pin carrying the cam.

6. A device of the character described, including a valve having a control member, and a control for the valve including a cam for engaging the control member to normally retain the control member in position where the valve is closed, a swingable arm on the cam for operating the cam, and means for preventing an object from being placed in the path of the arm, including spaced guards between which the arm operates.

7. A device of the character described, including a valve having a control member, and a control for the valve including a cam for engaging the control member to normally retain the control member in position where the valve is closed, and means mounting the cam for adjustment, including an eccentric pin rotatably carrying the cam, and means for releasably setting the pin in different rotative positions.

8. A device of the character described, including a valve having an operating stem, and a control for the valve including a cam operable to retain the stem in a position where the valve is closed, an arm on the cam, a releasable latch for holding the arm in a position where the cam holds the valve closed, and a pivoted handle on the arm operable to release the latch.

9. A device of the character described including, a valve body adapted to be connected in a conduit, the body having a fluid passage whose opposite ends have a common longitudinal axis and are adapted to connect with the conduit, a flow controlling member in the passage operable to prevent flow through the passage against fluid pressure, a stem on the member projecting laterally from the body relative to said axis, and means normally holding the member in the closed position including a cam for engaging the stem to hold the member closed, an arm on the cam, a releasable latch normally holding the cam against movement, a plunger operatable to release the latch and transmit force to the arm to turn the cam and an explosive charge adapted to be ignited to actuate the plunger to release the latch and forcibly operate the arm to a position where the said member is free to move to an open position.

10. A device of the character described including, a valve body adapted to be connected in a conduit, the body having a fluid passage whose opposite ends have a common longitudinal axis and are adapted to connect with the conduit, a flow controlling member in the passage operable to prevent flow through the passage against fluid pressure, a stem on the member projecting laterally from the body relative to said axis, and means normally holding the member in the closed position including a cam for engaging the stem to hold the member closed, the cam having its axis of movement substantially aligned with the axis of movement of the stem, an arm on the cam, a releasable latch normally holding the cam against movement, a plunger operable to release the latch and transmit a turning force to the arm, and explosive means for supplying fluid pressure to actuate the plunger to release the latch and forcibly operate the arm to a position where the said member is free to move to an open position.

SCOTT E. ALLEN.
OZRO N. WISWELL.